C. E. H. ARMBRUSTER.
DYNAMIC OPTOMETER.
APPLICATION FILED APR. 25, 1917.
1,306,734.
Patented June 17, 1919.
7 SHEETS—SHEET 1.
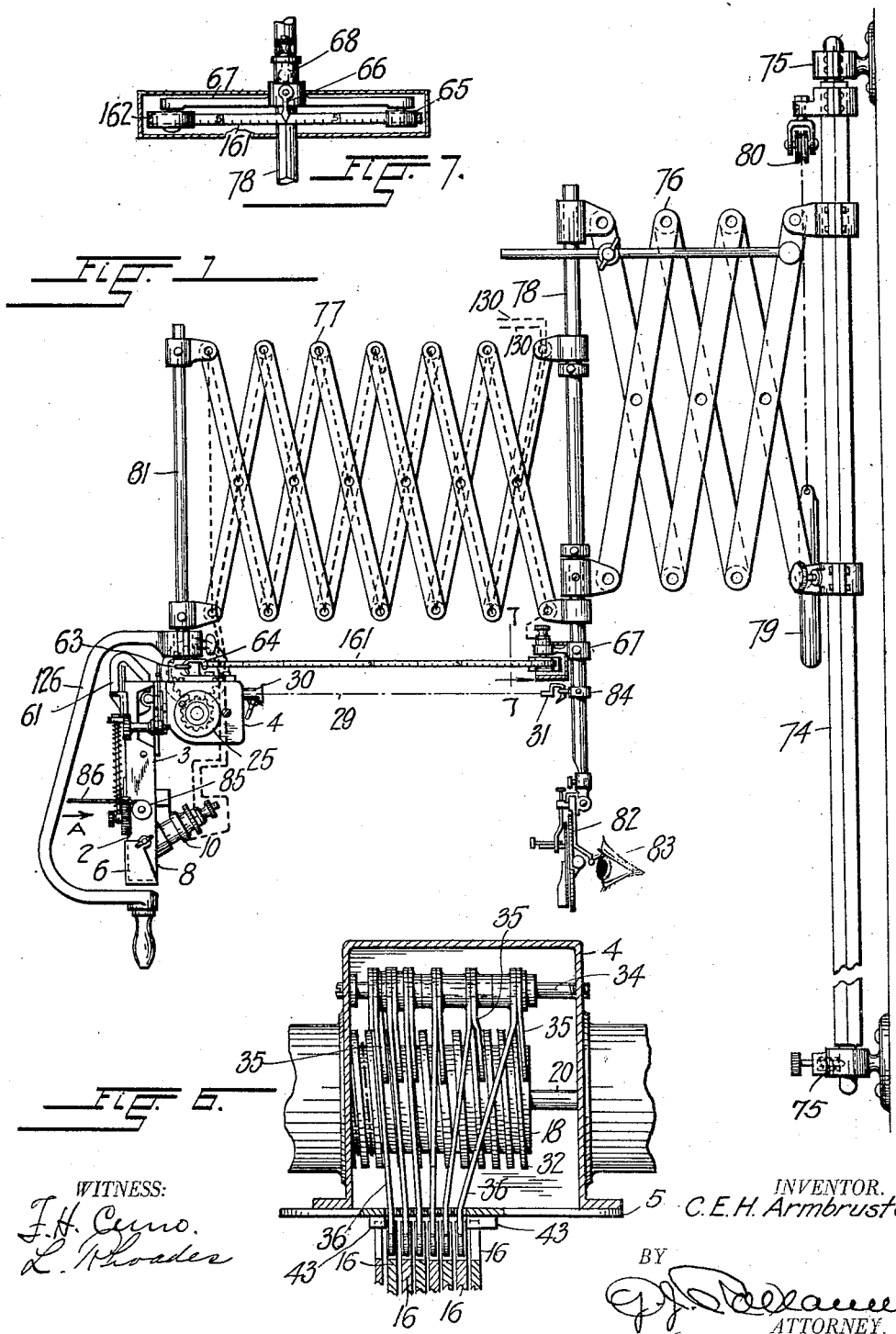
WITNESS:
INVENTOR.
C. E. H. Armbruster.
BY
ATTORNEY.

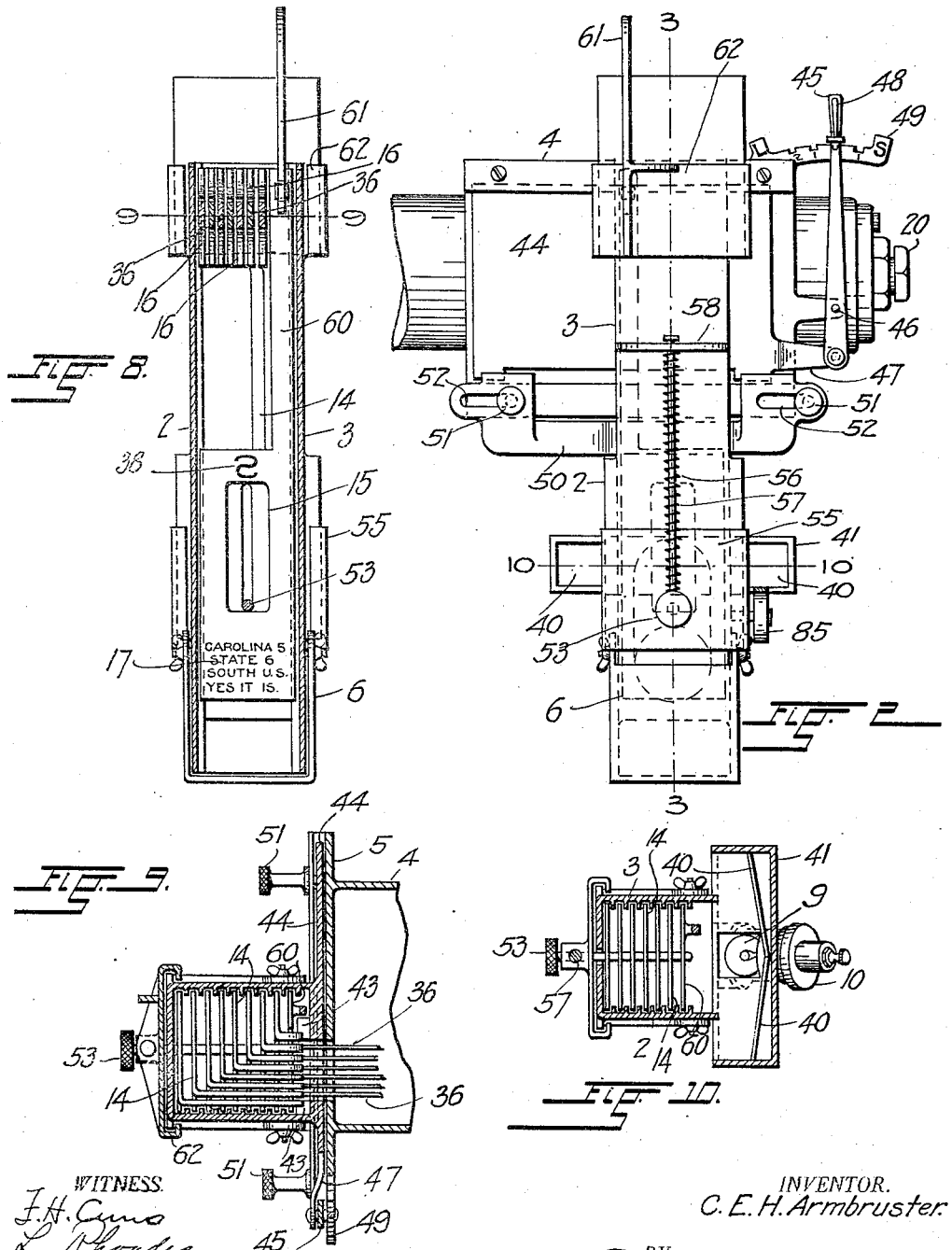

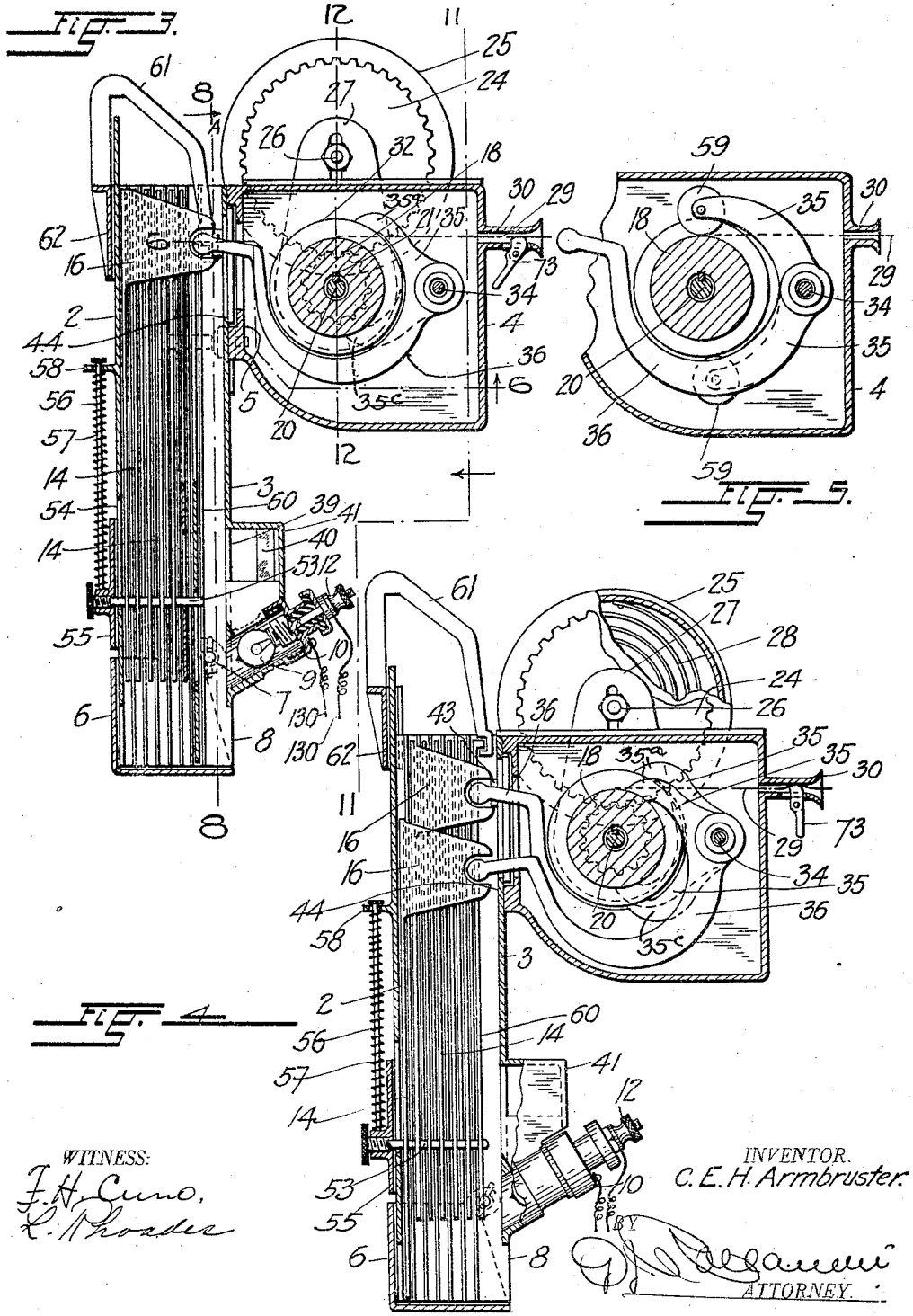

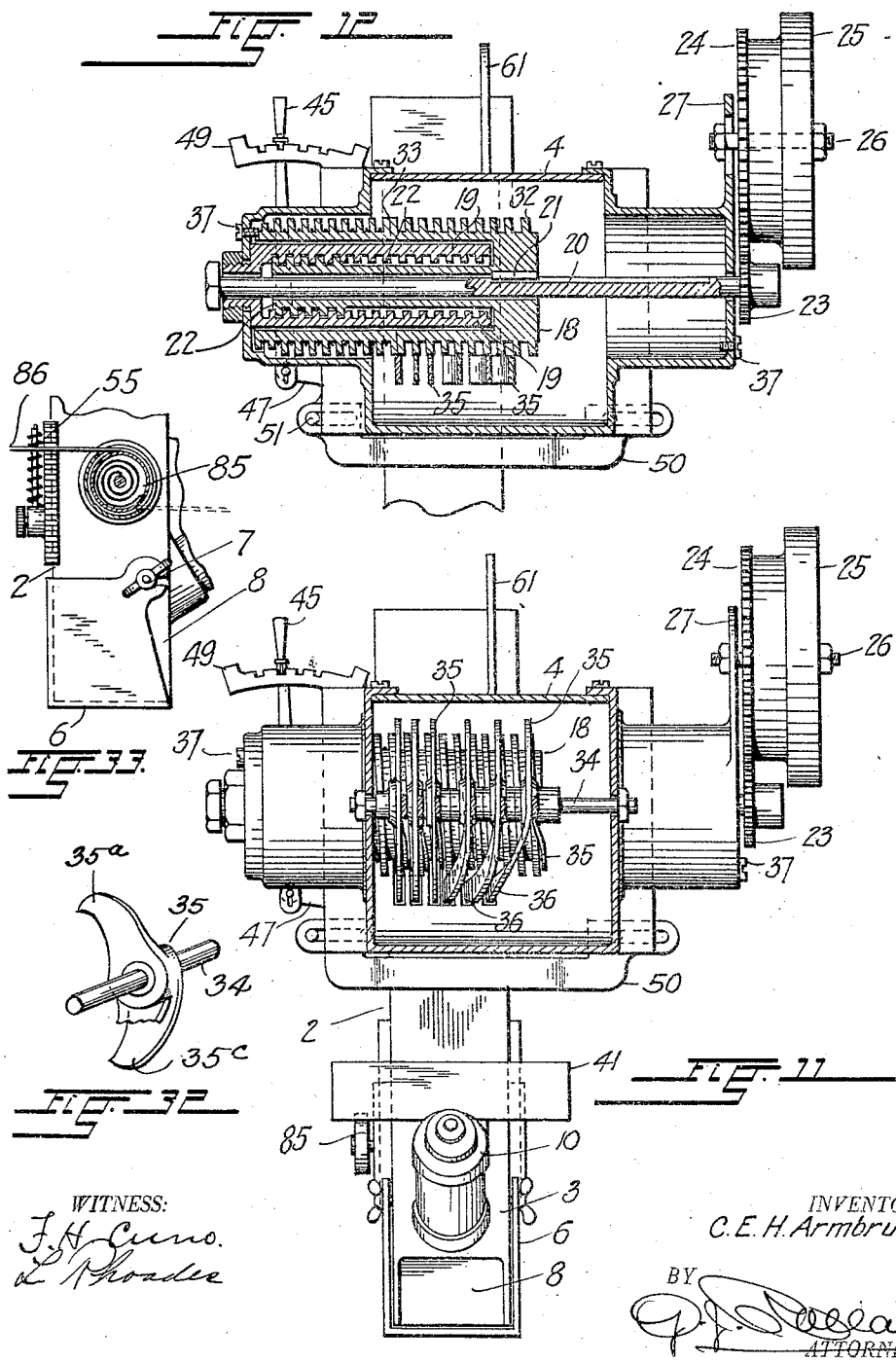

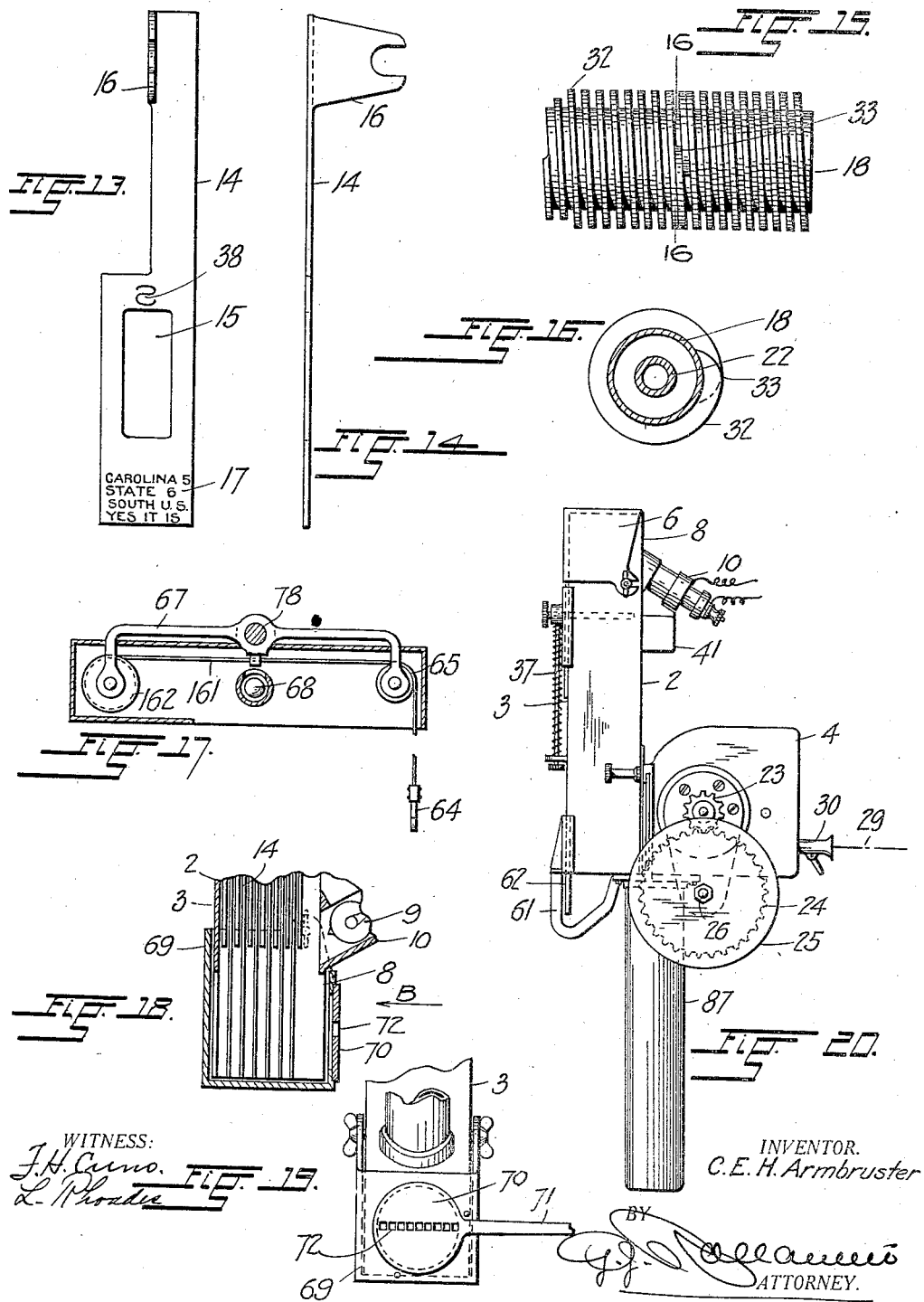

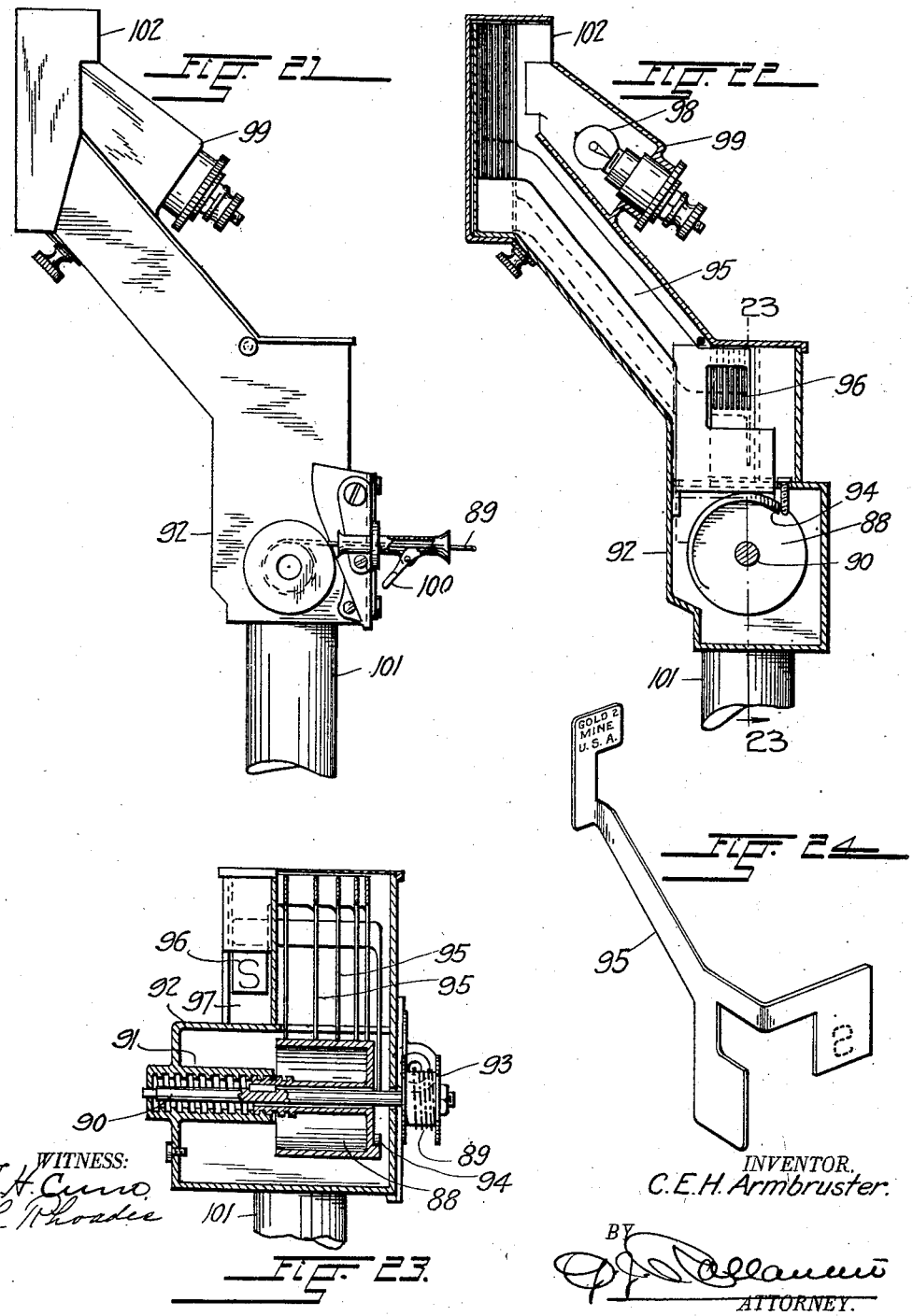

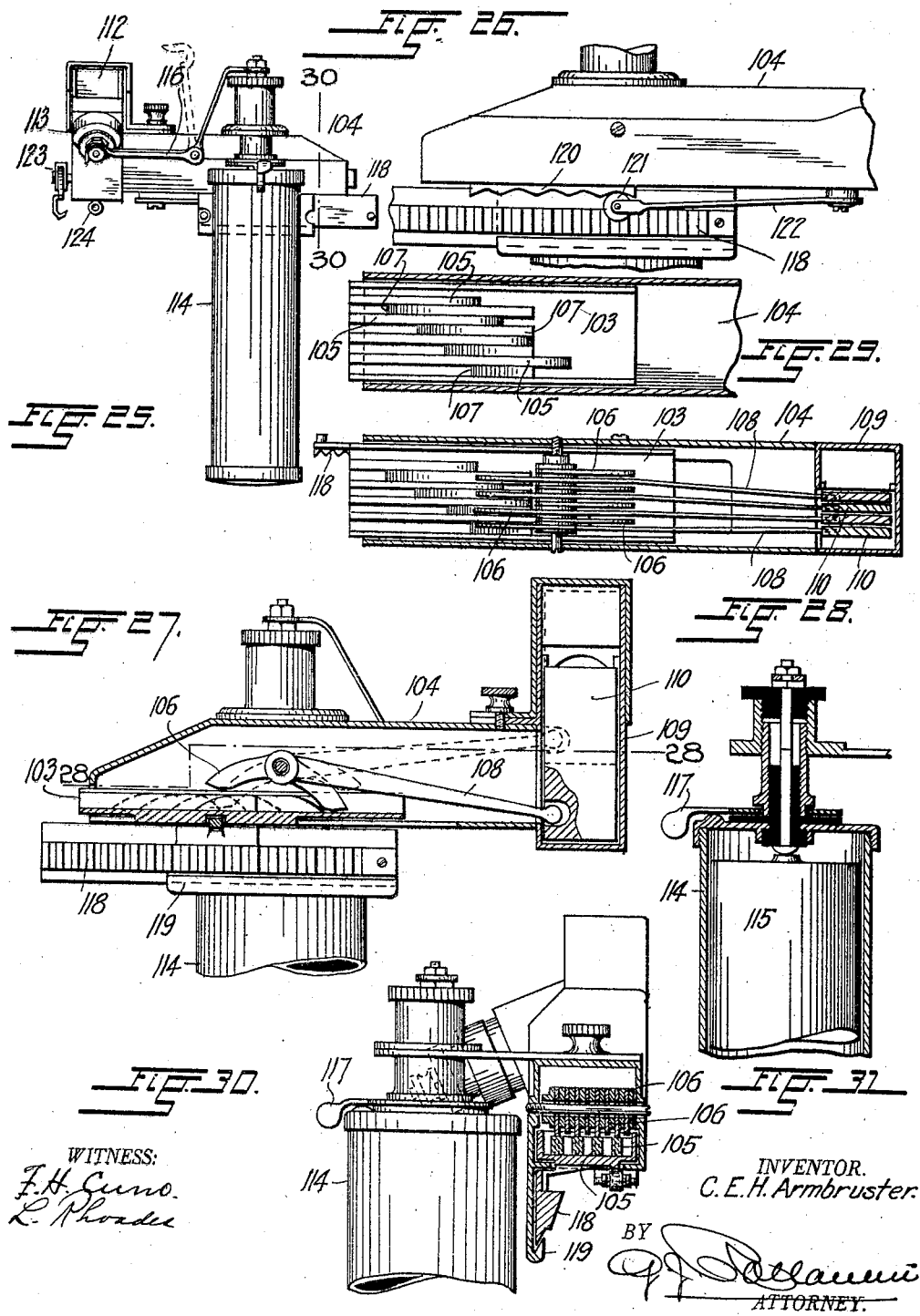

UNITED STATES PATENT OFFICE.

CHARLES E. H. ARMBRUSTER, OF DENVER, COLORADO.

DYNAMIC OPTOMETER.

1,306,734.   Specification of Letters Patent.   Patented June 17, 1919.

Application filed April 25, 1917. Serial No. 164,497.

*To all whom it may concern:*

Be it known that I, CHARLES E. H. ARMBRUSTER, a citizen of the United States, residing at Denver, in the county of Denver and State of Colorado, have invented certain new and useful Improvements in Dynamic Optometers, of which the following is a specification.

My invention relates to optical instruments and more particularly to an instrument for measuring the dynamic power of the eyes.

It is the primary object of my invention to provide an instrument which operates to display in successive order a series of charts bearing test-types of graduated sizes. The types on the charts may consist of pictorial representations, especially when the instrument is used to examine the eyes of children, but they are preferably made in the form of letters and words as being best adapted to determine the focusing power of adults.

The types on the different charts are graduated in size to correspond with the lengths of lines subtending the normal visual angle (five minutes) at predetermined distances from the eye, and it is a further object of my invention to provide in an instrument of the above-stated character, means to automatically display the charts at distances from the eye of a patient, corresponding with the predetermined distances from the eye hereinbefore referred to, by movement of the instrument along the visual line of the eye.

Other objects of my invention reside in providing in a dynamic optometer, subordinate devices to advance its accuracy in measuring the ocular focusing power and to adapt it for other purposes in the treatment and correction of muscular imperfections of the eyes.

Principal among these devices is an appliance to measure the lag or distance between the true focusing point of the eye and the nearer point at which the eye is naturally focused in the use of the instrument.

Over-accommodation of the eye or the distance between the point at which the eye is naturally focused and the true focusing point, if found to be between the first-mentioned point and the eye, may be measured by the same means and the proper correction of the vision by the use of lenses or by medical treatment, may thus be accurately determined.

Another auxiliary device used in connection with the instrument is an appliance which tests the muscular strength and balance of the eyes and determines their correction by the use of lenses or other appropriate treatment.

Still a further object of my invention resides in providing mechanical devices to facilitate the operation of the instrument by adjustment of its constituent elements or by rearranging the relative positions thereof.

With the above and other objects in view, all of which will fully appear in the course of the following description, the instrument comprises a mechanism which is actuated by a movement of the instrument along the visual line of the eye of a patient to automatically project at predetermined distances from the eye a series of charts bearing types which are graduated in ratio to the lengths of the lines subtending the normal visual arc of the eye at said distances.

By moving the instrument toward and from the eye of the patient, the operator may thus accurately and readily measure the distance at which the eye focuses and thereby determine the proper method of correcting any defect of the organ.

The instrument is adapted to measure the dynamic power of the eye, objectively by the use of a retinoscope, ophthalmoscope, or other similar instrument by which the operator may measure the refractive system of the eye, or, subjectively, when the operator regulates the movements of the instrument in accordance with statements of the patient as to the distance at which he can most easily read the characters on one of the charts.

The instrument is furthemore adapted to determine the peculiarities of one eye as a refracting medium as well as to measure the range of vision of both eyes simultaneously, and it may be employed as a hand instrument or in connection with a mechanical appliance to effect its movement along the visual line of an eye of a patient.

To the above and other objects which will hereinafter appear, my invention consists in the features of construction, arrangements of parts and combinations of devices, an illustrative embodiment of which has been shown in the accompanying drawings in the various views of which like parts are similarly designated and in which—

Figure 1 is an elevation of a dynamic optometer constructed in accordance with my invention in its preferred form, and mounted upon a mechanical appliance for moving it along the visual line of the eye of a patient, Fig. 2, an enlarged front elevation of the instrument, looking in the direction of the arrow A, Fig. 1, Fig. 3, a vertical section through the instrument on the line 3—3, Fig. 2, Fig. 4, a similar section showing one of the charts of the instrument in its projected position, Fig. 5, a fragmentary section of the slide-actuating drum of the instrument, showing a modified construction of the pawls by which the slides are adjusted through the medium of the drum, Fig. 6, a fragmentary section taken along the line 6—6, Fig. 3 looking in the direction of the arrow drawn across said line, Fig. 7, an enlarged section taken along the line 7—7, Fig. 1, Fig. 8, a longitudinal section through the instrument, along the line 8—8, Fig. 3, Fig. 9, a fragmentary transverse section on the line 9—9, Fig. 8, Fig. 10, a transverse section taken along the line 10—10, Fig. 2, Fig. 11, a vertical section on a plane designated by the line 11—11, Fig. 3, Fig. 12, a section along the line 12—12, Fig. 3, Fig. 13, a face view of one of the chart-bearing slides included in the invention, Fig. 14, an edge view of the same, Fig. 15, a face view of the slide-actuating drum of the operating mechanism of the instrument, Fig. 16, a transverse section taken along the line 16—16, Fig. 15, Fig. 17, a plan view of the tape-holding arrangement shown in detail in Fig. 7, Fig. 18, a sectional elevation of an end of the slide chambers of the instrument showing the application of an attachment for testing the muscles of the eyes, Fig. 19, a face view of the part shown in Fig. 18, looking in the direction of the arrow B, Fig. 20, an elevation of the instrument shown in the preceding figures, adapted for use by holding it in the hand of the operator, Fig. 21, a side elevation of a modified form of the invention, Fig. 22, a longitudinal section taken through the instrument shown in Fig. 21, Fig. 23, a section taken along the line 23—23, Fig. 22, Fig. 24, a perspective view of one of the slides used in the modified construction of the instrument, Fig. 25, a front elevation of another modification of the instrument, Fig. 26, an enlarged fragmentary rear elevation of the modified instrument illustrated in Fig. 25, Fig. 27, a vertical section through the housing of the instrument shown in Fig. 25, Fig. 28, a horizontal section taken along the line 28—28, Fig. 27, Fig. 29, a similar section showing a construction of the sliding table without the superposed parts of the actuated mechanism, Fig. 30, a section taken along the line 30—30, Fig. 25, Fig. 31, a sectional view of the upper portion of the handle of the instrument shown in Fig. 25, showing the method of electrically connecting a lamp of the instrument with a cell in said handle, Fig. 32, a perspective view of one of the double-pointed pawls included in the operating mechanism of the instrument in its preferred form, and Fig. 33, an enlarged elevation of the portion of the instrument shown in Fig. 1, at which the tape for measuring the lag or over-accommodation of the eye is located.

Referring first to the preferred form of my invention illustrated in Figs. 1 to 12, the reference character 2 designates a casing composed of a drum-housing 4 including a slotted face-plate 5, and an oblong slide chamber 3 of preferably rectangular section, which at its upper end is laterally adjustably supported in guide-ways on said plate.

The slide chamber is closed at its lower end by a bonnet 6 which is removably fastened as at 7 to afford access to the slides in their projected position, and it has at the lower end of its front surface which in practice faces the patient, a square opening 8 which constitutes the point of vision at which the patient focuses.

The slides projected in the chamber are brought to view by registration with this sight-opening as will hereinafter be explained and they are in their projected position illuminated by a small incandescent lamp 9 which is disposed in a tubular housing 10 connected with the chamber at a point immediately above the sight-opening as best shown in Fig. 3 of the drawings.

The lamp 9 is connected in an electric circuit by means of conductors 130 preferably arranged as shown in Fig. 1 of the drawings.

The slides 14 of the instrument one of which has been shown in detail in Figs. 13 and 14, each consist of a plate provided with a longitudinal slot 15 and a claw 16 extending at right angles at the upper end of the plate to grasp the end of an operating lever hereinafter to be described.

The slides are arranged in parallel longitudinally extending guide-ways in the chamber with the ends at which the claws are formed, uppermost, and the upper portion of each slide is reduced in width to provide a space in which the claws of the other slides may freely move.

The charts 17 which are displayed through the sight-opening 8 at the lower end of the slide chamber, are fixed upon the faces of the slides adjacent the lower extremities thereof and they may consist of square pieces of paper upon which the letters or characters of the required size are printed, drawn or otherwise affixed.

The longitudinal movement of the slides in the guide ways of the chamber for the purpose of projecting their charts to a position in register with the sight-opening 8, is effected by an operating mechanism of which a drum 18 mounted to rotate and move longitudinally in the before-mentioned housing 4, is the actuating element.

The drum is mounted upon an internally threaded cylindrical sleeve 19 fixed at one end of the housing and upon a shaft 20 which extends through the sleeve and which is rotatably supported in bearings at opposite ends of the housing.

The drum has to this end an axial bore through which the shaft extends and it is provided with a key or feather 21 which loosely extends into a longitudinal keyway of the shaft.

The drum is furthermore provided with a concentric annular recess which is open at one of its ends, to provide a hub 22 which is exteriorly threaded to coöperate with the thread of the relatively stationary sleeve 19.

The shaft carries at one of its ends exteriorly of the housing a pinion 23 meshing with a gear-wheel 24 on a cylindrical spring case 25 which is mounted for rotation upon a stud-shaft 26 extending laterally from a bracket 27 which forms a part of the drum housing.

The case 25 contains a coiled spring 28 which at its ends is secured to the stud-shaft 26 and to the case to yieldingly oppose the rotary movement of the drum 18 in one direction.

This movement of the drum is produced by means of a cord 29 which is fastened to the drum and wound upon its circumferential surface.

The cord extends through a guide-tube 30 on the housing and is attached to a hook 31 for its connection with a stationary object as is shown in Fig. 1.

It will be seen that when by unwinding of the cord the drum is rotated about the sleeve upon which it is rotatably supported, the shaft rotating in conjunction therewith through the medium of the key 21, tensions the spring 28 while the engagement of the screw thread of the core of the drum with that of the relatively stationary sleeve will compel the drum to move longitudinally along the shaft, the spring tending to return the drum to its normal position at one end of the housing as shown in Figs. 11 and 12, when the pull on the drum is subsequently discontinued.

The unwinding of the cord from the drum, when it is attached to a stationary support as in the method of operation illustrated in Fig. 1, is accomplished by pulling the instrument away from the support, and the cord is rewound upon the drum and the latter simultaneously returned to its original position by releasing the pull on the instrument and thereby permitting of its return movement toward the support by the expansion of the previously tensioned spring.

The drum has on its periphery a helically wound ridge 32 which at a point substantially intermediate of its ends, is contracted a distance equal to one-half its pitch to bring two of its convolutions at the said point in contiguous and lapping relation to each other as best shown at 33 in Fig. 15.

The ends of the lapping portions of the screw-thread are beveled as shown in Fig. 16, to compel a detent traveling through the spiral groove formed by the ridge, to rise out of said groove onto the peripheral edge of the ridge for the purpose of imparting a partial rotation to an element with which it is connected.

A shaft 34 fixed in parallel relation to the axis of the drum in openings at opposite ends of the drum-housing, carries a series of double-pointed pallets or pawls 35 the points 35ª and 35ᶜ of which extend at opposite sides of the shaft and are offset a distance equal to one-half the pitch of the spiral ridge on the drum, as shown in Fig. 32.

The shaft 34 is placed in sufficient proximity to the periphery of the drum to permit of the pawls engaging the ridge thereon by gravity, it being observed that as a result of the offset relation of the opposite point of each pawl one of said points will ride along the edge of the spiral ridge while the other travels through the adjoining portion of the groove between its convolutions.

Each of the pawls which are rotatably supported on the shaft, is rigidly connected with a lever arm 36, the outer extremity of which projects through one of the slots in the plate 5 to connect with the jaw of one of the slides 14.

When the slide with which the lever is connected is in its uppermost position in which the chart at its lower end is retracted from the sight-opening, the position of the pawl with relation to the spiral ridge of the drum as hereinbefore explained, locks it firmly against displacement and it remains in this position until the point 35$^c$ of the pawl traveling through the groove engages the approach at the point 33 at which the ridge is contracted.

During continued rotary movement of the drum the point 35$^c$ of the pawl which traveled in the groove of the ridge now rises along the approach onto the edge of the same and its opposite point 35$^a$ which formerly rode along said edge is simultaneously lowered into the adjacent portion of the groove.

As a result of this movement of the pawl the lever arm connected therewith is turned about the common pivotal axes of the pawls, and the corresponding slide is in consequence moved in its guide-ways a distance sufficient to project the chart at its lower end into register with the sight opening in the corresponding end of the chamber.

It will be seen from the above that when a number of pawls are assembled upon the shaft as in the construction shown in the drawings, the slides respectively connected therewith, will be moved successively to their projecting positions when the drum is rotated by unwinding of the cord and that subsequently they will be returned to their retracted positions in reverse order when by expansion of the coiled spring 28 the drum is rotated in the opposite direction and the cord is rewound upon its peripheral face.

By varying the distance between the pawls, the periods in the movement of the instrument when it is drawn away from the stationary support to which the cord 29 is attached, at which the slides are projected, are varied accordingly, and it follows that the projection of any slide to bring its chart in register with the sight-opening of the chamber in which it has its movement, may be regulated to occur at any desired distance from the point at which the cord is fastened to the stationary support.

By proportioning the test-types on the charts of the slides to correspond in height with the different lengths of the lines subtending the normal visual angle at the distances from the point of attachment of the cord at which the slides are projected by the movement of the respective pawls, the patient whose eye is placed in a position in a vertical plane with the point of attachment of the cord, can accurately determine its true point of focus owing to the fact that the test-types appearing through the sight-opening of the instrument which is in the visual line of the eye, will during movement of the instrument long said line, change automatically when it reaches the above-mentioned predetermined distances from the point at which the cord is fastened.

To prevent the drum from binding against the ends of the housing when it reaches the ends of its longitudinal movement, adjustable stops 37 are provided in the form of screws which project through threaded apertures into the housing 4 as best shown in Fig. 12.

To enable the operator positioned rearward of the instrument to know which particular slide is projected before the sight opening of the chamber, the slides have upon their face identification marks 38 which in the projected positions of the slides are opposite to an opening 39 in the front of the chamber.

Facing this opening are a pair of slanting mirrors 40 mounted in a housing 41 which is arranged exteriorly of the chamber and projects beyond the sides thereof as shown in Figs. 2 and 10.

The operator standing behind the instrument can thus see the reflected image of the identification mark on the projecting slide at either side thereof, the small incandescent lamp 9 being arranged with relation to the housing to illuminate the portion of the slide reflected in the mirrors.

While any suitable marks may be used to identify the different slides, it is preferable to number them in accordance with either the sizes of the types on their respective charts or with the distances from the fixed focusing point of the cord at which they are projected by the movement of the respective pawls upon the rotating and longitudinally moving drum.

In testing the eyes of different patients it is at times necessary that the sizes of the test types displayed before the sight opening of the instrument, be larger or smaller than the lines which subtend the normal visual angle at the distances to which the instrument is moved with relation to the eye of the patient.

To produce this effect in the use of the present instrument without interference with the projection of the slides, means are provided to adjust the series of slides bodily with relation to the levers by which a determinate number of slides contained in the series are successively operated.

With this object in view, the number of slides assembled in the slide chamber exceeds that of the pawls and levers by which a consecutive number of the series are projected and retracted, so that one or more slides at either end of the series are idle in the operation of the instrument.

The series of pawls are held against lateral displacement on the shaft 34 by collars or other suitable means and the rounded ends of their levers project through the slots in the plate 5, into the claws of the slides so as to permit of a lateral movement of the claws with relation thereto when the latter are in alinement as is the case when all the slides are in the retracted position illustrated in Fig. 3.

By moving the series of slides bodily to either side their position relative to the ends of the levers may thus be varied and any succession of slides in the series be placed in operative relation to the actuating mechanism.

In the instrument as it is shown in the drawings, there are two more slides than there are actuating units and any succession of slides corresponding in number with the units may be successively projected at the predetermined distances exclusive of either one or both of the slides at the ends of the series.

The relative arrangements of slides and actuating units is shown in the following diagram in which the adjustable series of slides is designated by numbers and the corresponding series of actuating units by letters.

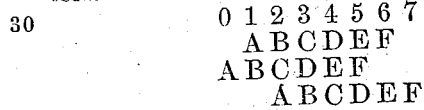

The slides at the ends of the series which in the operation are idle and unconnected with the levers of the actuating mechanism are supported upon rests 43 on the slotted plate 5 of the drum housing through which the levers project into the slide chamber and upon which the latter is laterally slidably supported.

The rests which are best shown in Figs. 3, 4 and 6, consist of blocks projecting inwardly from the plate of the drum-housing at opposite sides of the series of slots through which the ends of the levers project.

The adjustment of the series of slides is effected by changing the position of the chamber 3 in which they are assembled with relation to the housing 4 in which the operating mechanism is contained.

The connection between the chamber and the housing is, with this end in view, established by means of a plate 44 on the one which at its longitudinal edges is slidably fitted in parallel guide-ways on the before-mentioned face-plate 5 of the other.

A lever 45 fulcrumed as at 46 on the housing, has at its lower end a pivotal connection with an arm 47 projecting from the plate 44 on the slide chamber and its opposite arm carries a pawl 48 to coöperate with a toothed segment 49.

The teeth in the segment are arranged to correspond with the adjustments which can be made in accordance with the above diagram and they are marked to indicate exteriorly of the chamber the positions to which the slides within the same have been adjusted.

The letters "L" and "S" at the ends of the segment shown in Fig. 2, indicate the words "Large" and "Small" which refer to the sizes of the test types on the charts of the slides which are graduated progressionally from one end of the series to the other.

The guide-way at one side of the plate of the slide-chamber is preferably provided by a longitudinally movable plate 50 which normally is held in place by set-screws 51 extending through longitudinal slots 52, and which permits of the removal of the chamber from the housing for repairs or adjustment of the operative parts of the mechanism contained therein.

It will be readily understood that to effect the lateral adjustment of the series of slides with relation to the ends of the levers of the series of motion transmitting units, it is essential that the claws on the slides be in perfect alinement, irrespective of the position in which the instrument is held while the adjustment is being made.

To firmly hold the slides in this position, a pin 53 is provided which extends loosely through the before-mentioned slots 15 of the slides and a therewith registering slot 54 in the rearward face of the slide-chamber.

This pin is fastened to a plate 55 which has a sliding movement along said face of the chamber and which is held yieldingly in an inactive position by a coiled spring 56 which is wound around a rod 57 connected with the plate 55 and engages an abutment on the plate and a laterally projecting lug 58 on the chamber.

By moving the plate upwardly against the pressure of the spring, its pin is moved into engagement with the upper ends of the slots of the slides to hold them in their retracted positions while the chamber in which they are contained is being adjusted to the desired position with relation to the housing of the operating mechanism by means of the lever 45.

To facilitate the relative movements of the coöperative parts of the operating mechanism, the ends of the pawls which travel along the spiral ridge of the drum and through its constituent groove, may be provided with anti-friction rollers 59 as shown in Fig. 5.

In addition to the series of slides hereinbefore described, the chamber 3 contains a slide 60 which like the others is provided with a chart to be exposed through the sight-opening 8.

The supplemental slide is connected at its upper end with a handle 61 which projects over the upper end of the chamber and connects with a plate 62 which is slidably mounted on the rearward face of the chamber by embracing guide ribs at the longitudinal edges of said face.

The test types on the chart of the supplemental slide are usually made larger than those of the charts on the series of slides connected with the operating mechanism, its primary function being to provide a focusing point in ocular tests other than those above referred to.

In the examination of eyes by the use of my improved optometer as hereinbefore described, a tape line is used to measure the distance between the instrument and the eye of the patient.

The tape-line which in Fig. 1 of the drawings has been designated by the reference numeral 161, is wound in a coil upon a spring-controlled reel 162 in the casing which is fulcrumed at a point in or adjacent to the vertical plane of the eye of the patient to be examined.

One end of the tape is fastened to the reel and its opposite end is secured to the instrument which to this end is provided with an eye 63 to receive a hook 64 on the tape.

To enable the operator to read the distance between the instrument and the eye of the patient at a distance from the latter and without the necessity of changing his position behind the instrument, the heel 162 is preferably secured to one side of the line of vision as shown in Figs. 7 and 17 and the tape is trained about a sheave 65 to extend partially at right angles to said line.

The measuring tape is in this case arranged so that its graduation which registers with a pointer 66 fixed between the reel and the sheave, indicates the true distance between the instrument and the eye of the patient.

The reel, sheave and pointer are preferably assembled upon an arm 67 provided with means for securing it in a horizontal position and an incandescent lamp 68 may be placed on the same arm to illuminate the portion of the tape at which the pointer indicates the required measurement.

The instrument as shown and described may be used not only to determine the dynamic or focusing power of the eyes but also to conduct what is commonly known as the muscle test under accommodation, by which the balance of the muscles of motion of the eyes is ascertained.

A test of this character requires the provision of a small light or a line of small lights upon a non-illuminated field and to conduct the same by the use of the present instrument the bonnet 6 is removed from the lower end of the slide-chamber and a hood 69 such as shown in Figs. 18 and 19 is substituted therefor.

The hood which fits snugly over the end of the chamber has in its side which corresponds with the sight-opening 8 thereof, an opening which is covered by a rotary plate 70 provided with an operating handle 71.

The plate has a line of small square apertures 72 through which the reflected light from the lamp 9 is emitted to produce the effect of a series of brilliant spots arranged in a line upon a dark field.

In the operation of the muscle-testing attachment hereinabove described, we place in front of one eye of the patient, by the use of the perforated cap, what is known as a "Maddox rod" which produces a line of light which disassociates the two images seen by both eyes, from each other, allowing the weak muscle to relax, thus registering its error.

When the operator using the instrument desires the display of one of the series of charts continuously during a prolonged period, he may lock the drum against rotation and thereby secure the respective slide in its projected position, by clamping the cord 29 in the tube 30 through which it enters the drum housing, by means of a rotary cam 73 which is mounted in an opening of the tube as illustrated in Figs. 3 and 4 of the drawings.

With the parts of the instrument thus locked against relative movement, the operator may, after the cord has been detached from the eye 84, move the instrument to any desired position with relation to the eye of the patient, while any one of the charts is exposed to view through the sight-opening 8.

The instrument may be used to measure the focusing power of the eye of a patient by holding it in the hand of an operator or by mounting it upon an extensible bracket or arm which is secured to a stationary support adjacent the place at which the patient is positioned during the test.

An embodiment of a holding device of this character is illustrated in Fig. 1 of the drawings in which the reference numeral 74 designates an upright bar which by means of brackets 75 is rotatably supported in spaced relation to a wall or other suitable support.

The bracket proper to which the instrument is fastened, comprises two lazy-tongues 76 and 77 one of which is vertically slidably connected with the upright 74 and carries at its forward end a vertical rod 78 for the connection of the other.

A weight 79 on a cord running over a pulley 80 adjacent the top of the upright bar, is provided to maintain the lazy tongue 76 in its adjusted positions on the bar 74.

The outer lazy-tongue is attached to the rod 78 of the other and carries at its free extremity a vertical rod 81 which at its lower end has means to secure the optometer in an upright position and with the sight-opening at its lower end facing the support from which the bracket projects.

A trial-frame 82 adapted to hold a set of testing lenses before the eye of a patient, which in Fig. 1 is designated by the reference numeral 83, is secured at the lower end of the rod 78 in horizontal alinement with the sight-opening at the lower end of the instrument.

The same rod holds in superposed relation to said frame, the eye 84 to secure the hook 31 at the end of the winding cord, and the hereinbefore described arm 67 to which the spring reel and the guide sheave of the measuring element of the instrument are fastened.

A handle 126 extending downward of the optometer is adjustably secured to the rod 81 at the outward end of the bracket to be moved to any desired position as may best suit the convenience of an operator who stands behind the instrument.

In the operation of the invention as hereinbefore described and shown in Fig. 1 of the drawings, the operator first of all subjects the patient to what is commonly known as the distance test, by focusing the eyes upon a distant test-type to ascertain any errors of refraction in the eyes.

The operator subsequently places in the trial-frame behind which the patient is positioned, lenses which correct the refractive error and thereby establishes a substantially normal or emmetropic condition of the eyes.

The operator taking hold of the handle, now extends the bracket until the instrument at the forward end thereof, is, for example, 40 inches distant from the trial-frame, the measurement being readily ascertained by observing the position of the graduations on the measuring tape which is fastened to the instrument as hereinbefore explained, with the pointer 66 on the arm 66.

The operator now moves the instrument slowly toward the patient and either observes the eye of the patient looking into the sight-opening of the slide-chamber, by means of a retinoscope or other instrument of the same character, as is required in the objective test, or he ascertains the focusing point of the eye by statements of the patient as to the clearness of the test-types on the charts projected behind the sight-opening, as in the subjective test.

During the movement of the instrument away from the patient, the cord 29 which is fastened at its end to the eye 84 on the rod 78, unwinds from the drum 18 and causes the latter to rotate and simultaneously move longitudinally along the shaft upon which it is mounted.

Each time one of the double-pointed pawls which ride upon the periphery of the drum, is engaged by the forward one of the two approaches formed by the contraction of the helical ridge 32, it is compelled to move about its pivotal axis and thereby impart a corresponding movement to the respective lever 36.

The lever which preferably holds the respective slide in the normal retracted position indicated in Fig. 3, moves it to the projected position shown in Fig. 4 in which the chart at its lower end is in register with the sight-opening at the lower end of the chamber.

In this manner the different test-types of the series in the chamber are successively projected at periods in the movement of the instrument which are established by the distances at which it is separated from the stationary support.

These distances are predetermined by spacing the pawls connected with the slides at different distances apart and thereby varying the periods in the combined rotary and longitudinal movement of the drum at which they are actuated.

During subsequent return movement of the instrument toward the patient the above operation is reversed and the charts on the slides are retracted to consecutively expose the next preceding ones.

The forward movement of the instrument is continued until the punctum proximum or nearest point at which the eye can focus is reached, it being understood that as mentioned hereinbefore, this point may be established either by a statement of the patient as to the distinctiveness of the exposed test-type or by the use of the retinoscope in the hand of the operator.

Inasmuch as the test-types on the charts exposed at the different predetermined distances are proportioned in accordance with the lines subtending the normal visual angle at the same distances from the eye, the approximate focusing point of the eye or eyes of the patient is thus ascertained.

To subsequently determine the correct power of accommodation of the patient, the operator measures the lag, or in some cases the over-accommodation of the eye, by attaching to the retinoscope the free end of a measuring tape 86 wound on a spring-controlled reel which is mounted exteriorly of the casing of the instrument as shown at 85 in Fig. 1, and stretching the tape either rearward or forward of the instrument to the point which the operator finds by the use of the retinoscope, to be the true focusing point of the patient.

In this connection it must be understood that although the patient determines the position of the instrument by reading the proper test-type thereon, this position does not give the true focusing point of the eye inasmuch as the patient's true focus may be beyond the instrument or between the instrument and the eye, without his knowledge. The true focusing point can be determined only by the retinoscope in the hand of the operator.

The operator finally advances the instrument toward the patient until the distance between the eye and the chart in the instrument equals approximately the desired reading- or working distance, at which point the operator corrects the vision of the patient by placing lenses in the trial-frame which enable him to clearly see the test-type on the chart displayed at that distance and then with this knowledge and the knowledge of the accommodating power of the patient, previously obtained, prescribes the required lenses.

To correct the balance of the muscles of motion of the eyes, the operator before prescribing the lenses subjects the eyes to the muscle test by means of the cap 69 as hereinbefore explained, and includes the required muscle correction in the prescription.

The adjustment of the series of slides to vary the order in which they are consecutively projected at the predetermined distances, is availed of to suit the instrument for use in the examination of eyes which require a test by means of graduated types larger or smaller than the lines subtending the normal visual angle at the distances at which they are projected behind the sight-opening of the instrument.

While the use of the instrument in connection with an extensible bracket as shown in Fig. 1 is preferable it may also be effectively employed while held in the hand of the operator.

The measuring tape and winding cord are in this case attached to a stationary support adjacent to or forming part of the trial-frame and the instrument is for convenience provided with a handle and held in a position reversed from that in which it is secured to the bracket as shown in Fig. 1.

The instrument adapted for use by holding in it the hand has been shown in Fig. 20 in which the reference numeral 87 designates the handle which is attached at the end of the slide chamber opposite to that at which the sight-opening is formed.

It will be understood that many variations in the construction and relative arrangement of the elements and subordinate parts of the instrument as hereinbefore described may be resorted to without departing from the spirit of the invention.

A few of the more prominent modifications in the construction of the instrument have been illustrated in Figs. 21 to 24 and Figs. 25 to 31 of the drawings.

The construction embodied in the first-mentioned group of figures comprises a drum 88 which like that of the preferred construction is rotated by the winding and unwinding of a cord 89.

The drum is as in the other construction, slidably mounted upon a rotary shaft 90 and provided with an integral screw operatively engaging a threaded sleeve 91 which is fixed on the casing 92 in which the coöperative parts of the operating mechanism are assembled.

The cord is in this instance wound upon a hollow spool 93 in which a return spring is arranged as in the reel 25 of the first-described construction, but which is directly connected with the shaft on which the drum is mounted.

The periphery of the drum in this form of the invention is smooth and the drum has upon its ends an outwardly projecting lifting shoulder 94 the outer edges of which slant into the peripheral edge of the drum.

The slides 95 though differing in form from those of the first-described construction are similar in that they bear at their outer ends, charts which in their projected position extend opposite a sight-opening in the end of the chamber in which the slides are assembled.

The slides have laterally projecting tabs 96 which bear their numerical identification marks and which when the slides are in the projected position are exposed before an opening 97 in the rear face of the casing.

An electric lamp 98 disposed in a housing 99 is provided as in the preferred form of the invention to illuminate the charts at the ends of the projected slides.

When the slides are in their normal retracted position they rest upon the shaft 90 and they are in the combined rotary and longitudinal movement of the drum, successively lifted to the periphery thereof by means of the shoulder 94.

The lower portions of the slides are offset to space their ends at which they engage the drum, in accordance to the predetermined distances from the eye of the patient at which it is desired to expose the charts during movement of the instrument along the line of vision of the eye.

A cam 100 to hold any one of the slides in its projected position by engagement with the winding cord, is as in the other form, disposed to move through an opening in a tube through which the cord extends, and a handle 101 at the end of the casing opposite to that at which the sight-opening 102 is located, adapts the instrument to be held in the hand of the operator.

In all the forms of my invention it is essential that the width of the sight opening be restricted to a minimum so that the operator standing behind the instrument, can, in examining an eye focused upon the test type exposed through the opening, look as nearly as possible along the line of vision of the eye and thereby determine its condition more accurately than if he looked into the eye along a line at a larger angle to the visual line.

Figs. 25 to 31 show another modification of the invention, the distinctive feature of which is an actuating element which though operating on the same principle upon which the action of the rotating drums of the other forms is based, actuates the slides at optional periods in the movement of the instrument along the visual line of the patient by a rectilinear reciprocating motion imparted thereto by the operator.

The actuating element consists of a table 103 which is mounted for rectilinear reciprocation upon parallel flanges extending inwardly at the lower edges of an oblong rectangular horizontally extending casing 104.

The table has upon its upper surface a series of parallel ridges 105 which slant at their forward edges to provide approaches for pawls 106 which bear upon the bottom surface of the same.

The ridges are progressionally reduced in length to vary the periods at which the approaches at their ends engage the pawls which as in the first-described form of my invention are double-pointed and mounted to move about a common axis.

Occupying the spaces between the ridges 105 is a second series of ridges 107 which are correspondingly arranged in reverse order to actuate the pawls in the return movement of the table.

The pawls which in form, arrangement and operation are identical to those of the preferred form of my invention are connected with lever arms 108 which at their outer ends extend loosely in notches of the slides 110 which are mounted in a series in a chamber 109 secured at an end of the table-casing 104.

The slide-chamber has at its upper end a sight-opening 112 for the display of charts on the ends of the slides, and adjacent to said opening a housing 113 for an incandescent lamp by which the exposed charts are illuminated.

The casing 104 is mounted upon a hollow handle 114 which contains an electric cell 115 connected in a circuit with the lamp.

A switch comprising a pivoted hook 116 which connects with a pole of the cell is provided to establish an electrical connection between the said pole and one of the terminals of the lamp in the housing, and a second switch 117 is connected in the same side of the circuit to control the flow of current while the instrument is held in the hand of the operator.

The sliding table has exteriorly of the casing in which it moves, a parallel knurled finger-piece 118 which snugly rests upon a ridge 119 on the casing and is readily accessible to a finger of the hand in which the handle of the instrument is held.

The table has furthermore a ridge 120 provided with notches which are relatively arranged in accordance with the arrangement of the approaches of the ridges on the surface of the table.

A roller 121 at the end of a spring 122 enters the notches as shown in Fig. 26 and by frictional contact therewith, arrests the movement of the table after each projection or retraction of one of the series of slides.

A spring-controlled tape-reel 123 is as in the other form, placed at an end of the casing to measure the lag or over-accommodation, and an eye 124 is provided for the attachment of a graduated tape by which the distances between the instrument and the eye of the patient are measured.

In the operation of the instrument shown in Figs. 25 to 31, the operator holding the instrument in the hand recedes from or advances toward the patient after the measuring tape has been fastened to the eye 124.

At selected distances in the movement of the instrument along the visual line of the patient, the operator projects the slides consecutively by moving the table 103 by means of the knurled finger-piece 118 it being understood that the pawls which normally rest upon the bottom surface of the table as in Fig. 27, are turned about their pivotal axes and thereby raise the levers and slides when their lowermost points are engaged by the approaches of the corresponding ridges.

When this occurs, the point of the pawl which engages the bottom surface of the table, is raised to the corresponding edge of the ridge along which it slides while its opposite point is lowered to engage the bottom surface of the table adjoining the ridge.

It will thus be seen that as in the first-described form, the slides are rigidly held in their adjusted positions and that when the table is moved in the opposite direction the above-described operation is reversed and the slides are consecutively returned to their retracted position.

The periods in the movement of the instrument toward and from the eye of the patient at which the charts are changed, are in the last-described instrument, entirely optional with the operator, and the instrument differs in this respect from the other forms of the invention in which the changes are automatically effected at predetermined distances from the eye of the patient in the

Having thus described my invention what I claim and desire to secure by Letters-Patent is:

1. In a dynamic optometer, a casing having a sight-opening for the display of test-charts, a lamp illuminating the interior of said casing, behind said opening, and an opaque plate covering said opening and having an aperture for the emission of light-rays.

2. In a dynamic optometer, a casing having a sight-opening for the display of testing-charts, a lamp illuminating the interior of said casing, behind said opening, and an opaque plate covering said opening and having a series of alined apertures for the emission of light-rays.

3. In a dynamic optometer, a casing having a sight-opening for the display of test-charts, a lamp illuminating the interior of said casing, behind said opening, and a rotary plate covering said opening and having an aperture for the emission of light-rays.

4. In a dynamic optometer, a casing having a sight-opening for the display of test-charts, a lamp illuminating the interior of said casing, behind said opening, and a cap removably fitted upon an end of said casing to cover said opening, and having an aperture for the emission of light-rays.

5. In a dynamic-optometer, a movable instrument carrying a test-type, a measuring device to indicate a distance to which the instrument is moved with relation to a relatively stationary point, and a second measuring device to indicate the distance between the instrument and a focusing point outside the same.

6. In a dynamic optometer, a casing a series of movable slides therein, bearing test-types and identification marks, mechanism for moving said slides successively to expose their types and their identification marks at determinate points of the casing, and a mirror on the casing for the reflection of the identification marks of the slides in their exposed position.

7. In a dynamic optometer, a casing, a series of movable slides therein, bearing test-types and identification - marks, mechanism for moving said slides successively to expose their types and their identification marks at determinate points of the casing, a mirror on the casing for the reflection of the identification marks of the slides in their exposed position, and a lamp illuminating said identification marks.

8. In a dynamic optometer, a casing, a series of slides therein, bearing test-types, and mechanism for moving said slides successively to expose their test-types at a determinate point of the casing, including a series of motion transmitting units in operative connection with said slides, an actuating-element having a combined rotary and rectilinear movement and provided with means to successively actuate said units during its said movement, and a winding cord for the operation of said element.

9. In a dynamic-optometer, a casing, a series of slides therein, bearing test-type, and mechanism for moving said slides successively to expose their test-types at a determinate point of the casing, including a series of motion-transmitting units in operative connection with said slides, a spring-controlled actuating element having a combined rotary and rectilinear movement and provided with means to successively actuate said units during its said movement, and a winding cord for the operation of said element.

10. In a dynamic optometer, a casing, a series of slides therein, bearing test-types, and mechanism for moving said slides successively to expose their test-types at a determinate point of the casing, including a series of motion-transmitting units in operative connection with said slides, a rotary shaft, an actuating element having a screw-thread and slidably mounted on said shaft to rotate in conjunction therewith, a stationary nut meshing with said screw-thread, to impart a rectilinear movement to said element during its rotation, and a winding cord for the rotation of said shaft, the actuating element having means to actuate said units successively during its said movements.

11. In a dynamic optometer, a casing, a series of slides therein, bearing test-types, and mechanism for moving said slides successively to expose their test-types at a determinate point of the casing, including a series of motion-transmitting units in operative connection with said slides, a rotary shaft, an actuating element having a screw-thread and slidably mounted on said shaft to rotate in conjunction therewith, a stationary nut meshing with said screw-thread, to impart a rectilinear movement to said element during its rotation, a spring connected with the shaft to yieldingly oppose its rotary movement in one direction, and a winding cord for the rotation of said shaft, the actuating element having means to actuate said units successively during its said movements.

12. In a dynamic optometer, a casing, a slide therein, bearing a test-type, mechanism for moving said slide to expose its test-type at a determinate point of the casing, said mechanism comprising a motion-transmitting unit in operative connection with said slide and including a pawl having two laterally offset points, and a movable element having a parallel ridge and groove adapted to respectively engage the two points of said pawl, said ridge being offset at a given point and having its ends at said point brought in contiguous and lapping relation to each other to reverse the position of the points of the pawl relative to said groove and ridge during movement of said element.

13. In a dynamic optometer, a casing, a series of slides therein, bearing test-types, mechanism for moving said slides successively to expose their test-types at a determinate point of the casing, said mechanism comprising a series of motion-transmitting units operatively connected with said slides, and including pivoted pawls each having two laterally offset points, and a movable element having a parallel ridge and groove adapted to respectively engage the points of each pawl, said ridge being offset at a given point and having its ends at said point brought in contiguous and lapping relation to each other to reverse the position of the points of each pawl relative to said groove and ridge during movement of said element.

14. In a dynamic optometer, a casing, a series of slides therein, bearing test-types, mechanism for moving said slides successively to expose their test-types at a determinate point of the casing, said mechanism comprising a drum having a combined rotary and longitudinal movement and provided with a helical ridge which is contracted a distance equal to half its pitch to bring its convolutions together in lapping relation at a given point, and motion-transmitting units including pivoted pawls each having two laterally offset points in engagement with said ridge and its constituent groove, the lapping ends of said convolutions being tapered to form approaches for the pawls onto the edge of the ridge.

15. In a dynamic optometer, a test-type carrying instrument movable with relation to a relatively fixed point, and a winding measuring tape on the instrument having means for its attachment to a retinoscope or the like and adapted to measure a distance to which the retinoscope is moved from a test type on the instrument in opposite directions.

16. A dynamic optometer comprising an extensible bracket fixed at one end, a test-type carrying instrument carried at the free end of the bracket, and a measuring device operated by the movement of the bracket to indicate the distances to which the instrument is moved with relation to a relatively fixed point.

17. In a dynamic optometer, a carrier, a series of test-types movable on said carrier to separately and in successive order appear at a determinate point thereof, a connection by which the carrier is adapted to travel in a straight line with relation to a given point, and mechanism for the operation of said series of test-types, coöperative with said connection to effect their intermittent movement at determinate distances from said given point.

18. In a dynamic optometer, a carrier, a series of test-types movable on said carrier to separately and in successive order appear at a determinate point thereof, an extensible bracket by which the carrier is adapted to travel in a straight line with relation to a given point, and mechanism for the operation of said series of test-types, coöperative with said bracket to effect their intermittent movement at determinate distances from said given point.

19. In a dynamic optometer, a carrier, a series of test-types movable on said carrier to separately and in successive order appear at a determinate point thereof, a connection by which the carrier is adapted to travel in a straight line with relation to a given point, mechanism for the operation of said series of test-types coöperative with said connection to effect their intermittent movement at determinate distances from said given point, and a winding graduated tape between said point and the instrument for measuring the distances from said point at which said operations take place.

20. In a dynamic optometer, a carrier, a test-type movable on said carrier to appear at a determinate point thereof, a connection by which the carrier is adapted to travel in a straight line with relation to a given point and mechanism for the operation of said test-type, coöperative with said connection to effect its intermittent movement at determinate distances from said given point.

21. In a dynamic optometer, a carrier, a series of separately movable test charts movable on said carrier to separately and in successive order appear at a determinate point thereof, a connection by which the carrier is adapted to travel in a straight line with relation to a given point, and mechanism for the operation of said test-charts coöperative with said connection to effect their intermittent movement at determinate distances from said given point.

22. In a dynamic optometer, a carrier having a restricted sight opening, a series of test types movable on said carrier to be brought separately and in successive order in register with said opening, a connection by which the carrier is adapted to travel in a straight line with relation to a given point, and mechanism for the operation of said series of test-types, coöperative with said connection to effect their intermittent movement at determinate distances from said given point.

23. In a dynamic optometer, a carrier, a series of test-types graduated in size in accordance with the different lengths of lines subtending a visual angle at predetermined distances from the eye, a connection by which the carrier is adapted to travel in a straight line with relation to a given point, and mechanism for the operation of said series of test types coöperative with said connection to effect their intermittent movement at distances from said given point which correspond in length with said predetermined distances.

24. In a dynamic optometer, a carrier, a series of test types graduated in size in accordance with the different lengths of lines subtending the normal visual angle at predetermined distances from the eye, a connection by which the carrier is adapted to travel in a straight line with relation to a given point, and mechanism for the operation of said series of test-types coöperative with said connection to effect their intermittent movement at distances from said given point which correspond in length with said predetermined distances.

25. In a dynamic optometer, a carrier, a series of test-types movable on said carrier to separately and in successive order appear at a determinate point thereof, a winding flexible connection by which the carrier is adapted to travel in a straight line with relation to a given point, and mechanism for the operation of said series of test-types, coöperative with said connection to effect their intermittent movement at determinate distances from said given point.

26. In a dynamic optometer, a carrier, a series of test-types movable on said carrier to separately and in successive order appear at a determinate point thereof, a connection, a spring-controlled winding drum on the carrier, a flexible cord on said drum by which the carrier is adapted to travel in a straight line with relation to a given point at which its free end is attached, and mechanism for the operation of said test types coöperative with said cord to effect their intermittent movement at determinate distances from said given point.

27. In a dynamic optometer, a casing, a series of test-type-bearing slides thereon which are separately movable to a position in which their test-types are displayed at a determinate point of the casing, and mechanism adapted to move said slides in successive order to said position, including a plurality of actuating units adapted to operatively connect with a corresponding number of successive slides in said series, said series of slides being movable in its entirety to bring any one of a number of determinate successions of slides in the series, in operative relation to said actuating units.

28. In a dynamic optometer, a casing, a series of test-charts thereon which are separately movable to a position in which their test-types are displayed at a determinate point of the casing, and mechanism adapted to move said charts in successive order to said position, including a plurality of actuating units adapted to operatively connect with a corresponding number of successive charts in said series, said series of charts being movable in its entirety to bring any one of a number of determinate successions of charts in the series in operative relation to said actuating units.

29. In a dynamic optometer, a casing, a series of test-type-bearing slides thereon which are separately movable to a position in which their test-types are displayed at a determinate point of the casing, mechanism adapted to move said slides in successive order to said position, including a plurality of actuating units adapted to operatively connect with a corresponding number of successive slides in said series, said series of slides being movable in its entirety to bring any one of a number of determinate successions of slides in the series, in operative relation to said actuating units, and an indicator outside the casing to designate the position of the series within the same.

30. In a dynamic optometer, a casing having two openings at different points thereof, and a series of test-type-bearing slides movable in said casing to a position in which their respective types are in register with one of said openings, said slides bearing identification marks which register at the same time with the other opening.

31. In a dynamic optometer, a carrier, a series of test-types movable on said carrier to separately and in successive order appear at a determinate point thereof, a connection by which the carrier is adapted to travel in a straight line with relation to a given point, mechanism for the operation of said series of test-types coöperative with said connection to effect their intermittent movement at determinate distances from said given point, a supplemental test-type separate from said series, and manually operated means for moving said supplemental test-type to appear at said determinate point of the carrier.

32. In a dynamic optometer, a carrier, a series of test-types movable on said carrier to separately and in successive order appear at a determinate point thereof, a rotary drum and a winding cord thereon providing a connection by which the carrier is adapted to travel in a straight line with relation to a given point, and mechanism for the operation of said test-types, coöperative with said cord to effect their intermittent movement at determinate distances from said given point.

33. In a dynamic optometer, a carrier, a series of test-types movable on said carrier to separately and in successive order appear at a determinate point thereof, a rotary drum, and a winding cord thereon providing a connection by which the carrier is adapted to travel in a straight line with relation to a given point, mechanism for the operation of said test-types, coöperative with said cord to effect their intermittent movement at determinate distances from said given point, and a clamp acting upon said cord to lock the drum against rotation and thereby hold any one of said test types in the position to which it is moved by the operation of said mechanism.

34. In a dynamic optometer, the combination with a carrier having a sight-opening, of a plurality of test-type charts separately movable therein, means to effect a movement of the carrier whereby to vary its distance from a given point, and mechanism coöperative with said means, to move the charts in regular order, to a position in which they register with the sight-opening.

35. In a dynamic optometer, the combination with a carrier having a sight-opening, of a plurality of test-type charts separately movable therein, means to effect a movement of the carrier whereby to vary its distance from a given point, and mechanism coöperative with said means, to move the charts at predetermined distances from said point and in regular order to a position in which they register with the sight-opening.

36. In combination, a support, a series of test-types movable thereon, mechanism for moving the test-types to separately expose the same, and a tape coöperative with the mechanism to actuate the same at predetermined points in a movement by which an end thereof is separated from the support.

37. In combination, a support, a series of test-types movable thereon, and graduated in size in ratio to the different lengths of lines subtending a visual angle at predetermined distances from the eye, mechanism for moving the test types to separately expose the same, and a tape coöperative with the mechanism to actuate the same at points in a movement by which an end thereof is separated from the support, at which the distances between said end and the support correspond in length with the first-mentioned distances.

38. A dynamic optometer comprising a member having a sight-opening, a relatively movable member bearing a series of test-types of graduated sizes, adapted to be brought successively in register with said opening by a determinate movement of the member, connecting means which permit of the instrument being moved in a straight line with relation to a given point, and mechanism coöperative with said means for effecting an operative movement of the test-type bearing member by said movement of the instrument.

39. A dynamic optometer comprising a member having a sight-opening, a relatively movable member bearing a series of test types of graduated sizes, adapted to be brought successively in register with said opening by a determinate movement of the member, connecting means which permit of the instrument being moved in a straight line with relation to a given point, and mechanism coöperative with said means for effecting an operative movement of the test-type bearing member by said movement of the instrument, at determinate distances from said point.

40. A dynamic optometer comprising a carrier, a rotary series of test-types thereon, mechanism for rotating said series for their separate exposure, and a tape having means coöperative with the mechanism to actuate the same at determinate points in a movement of the carrier with relation to a point at which the tape is fastened.

In testimony whereof I have affixed my signature in presence of two witnesses.

CHARLES E. H. ARMBRUSTER.

Witnesses:
G. J. ROLLANDET,
L. RHOADES.